United States Patent [19]

Hewitt

[11] Patent Number: 5,706,779
[45] Date of Patent: Jan. 13, 1998

[54] VEHICLE SPEED LIMITING SYSTEM

[76] Inventor: John T. Hewitt, 30760 Tarapaca Rd., Ranch Palos Verdes, Calif. 90274

[21] Appl. No.: 672,681

[22] Filed: Jun. 28, 1996

[51] Int. Cl.$^6$ .................................................. F02D 33/00
[52] U.S. Cl. ................................................................ 123/332
[58] Field of Search .......................... 123/332, 198 DB, 123/401, 333, 357

[56] References Cited

U.S. PATENT DOCUMENTS

| | | | |
|---|---|---|---|
| 2,398,878 | 4/1946 | Bolli | 123/332 |
| 3,902,076 | 8/1975 | Meyers et al. | 307/57 |
| 3,916,853 | 11/1975 | Lombard | 123/332 |
| 3,948,116 | 4/1976 | Van Pelt | 74/482 |
| 3,948,231 | 4/1976 | Smith | 123/332 |
| 3,949,716 | 4/1976 | Liu | 123/332 |
| 4,103,652 | 8/1978 | Garside et al. | 123/332 |
| 4,175,530 | 11/1979 | Asano et al. | 123/332 |
| 4,204,513 | 5/1980 | Bilbrey et al. | 123/198 DB |
| 4,223,653 | 9/1980 | Jaenke et al. | 123/366 |
| 4,245,598 | 1/1981 | Ruhl | 123/333 |
| 4,351,293 | 9/1982 | Hewitt | 123/332 |
| 4,422,354 | 12/1983 | Bandy | 74/860 |
| 4,422,420 | 12/1983 | Cromas et al. | 123/352 |
| 4,718,229 | 1/1988 | Riley | 60/39 |
| 4,862,849 | 9/1989 | Wilson | 123/332 |
| 4,924,827 | 5/1990 | Mineglski | 123/332 |
| 4,977,876 | 12/1990 | Mangoski et al. | 123/333 |
| 4,991,552 | 2/1991 | Luft et al. | 123/401 |
| 5,207,198 | 5/1993 | Eisele | 123/357 |
| 5,315,977 | 5/1994 | Fossien | 123/357 |
| 5,370,097 | 12/1994 | Davis | 123/526 |
| 5,389,051 | 2/1995 | Hirate et al. | 177/111 |
| 5,490,379 | 2/1996 | Wernberg et al. | 60/39.281 |

*Primary Examiner*—Raymond A. Nelli
*Attorney, Agent, or Firm*—J. F. McLelland

[57] ABSTRACT

A vehicle speed limiting system for a vehicle having an engine which includes a plurality of fuel injectors coupled to an inline, low volume fuel injection pump operative to successively trigger a flow of fuel directly to the individual fuel injectors. The vehicle speed is converted to a speed signal which, when it reaches a preset limit, is utilized by the system control to close a fuel control valve through which fuel normally passes to the injection pump, and also to simultaneously open a pressure regulator. The fuel control valve includes a small orifice to pass just enough fuel to prevent pump cavitation. The system is characterized by a low fuel residual upon cutoff by the fuel control valve so that the engine speed is quickly slowed for lack of fuel.

10 Claims, 4 Drawing Sheets

VEHICLE SPEED LIMITING SYSTEM

FIELD OF THE INVENTION

The present invention relates to a vehicle speed limiting system for a vehicle having an injection pump, the system being operative to control the speed over a preset limit by cutting off all fuel flow to the fuel injection pump except for a predetermined amount necessary to prevent fuel injection pump cavitation.

BACKGROUND OF THE INVENTION

There are many reasons for limiting the speed of an engine over a preset limit. Legal speed limits, fuel economy and safety considerations are among the important factors, particularly in connection with the operation of heavy duty vehicles or trucks.

Various systems have been advanced for achieving engine speed limitation in such vehicles. Those of particular pertinence to the present invention are compression ignition or diesel engines having inline or rotary fuel injection pumps. Such pumps are operative to successively trigger a flow of fuel directly to the individual injectors.

This is in contrast to a diesel engine such as a Cummins engine characterized by a common rail line having a relatively high fuel pressure constantly applied to all of the engine injectors. The flow of fuel to each individual injector is mechanically done at the engine by a push rod actuated by a cam or cam shaft.

U.S. Pat. No. 4,245,698 issued to Ruhl discloses a system for limiting the maximum speed of trucks by blocking fuel flow to the engine by means of a normally closed solenoid valve connected between the fuel rail and the fuel tank. When the valve is open it permits fuel flow to bypass the engine, thereby reducing fuel flow to the engine. The normally closed valve only opens when the truck speed exceeds acceptable limits.

A system similar to Ruhl is disclosed in U.S. Pat. No. 4,862,849, issued to Wilson. It also operates to bypass fuel to slow the engine.

A fuel limitation system is also disclosed in U.S. Pat. No. 4,422,420, issued to the inventor of the present invention. It accomplished fuel limitation by means of a solenoid valve connected between the fuel pump and the fuel rail. This valve was normally open and was only closed when the speed exceeded the desired limit.

Bypass systems depend upon depriving an engine of fuel. However, on shut off there is residual fuel in the fuel rail and in the Cummins type injection pump, all of which must be bypassed before the engine will slow. Bypassing such fuel requires an unacceptable amount of time, and it is therefore not practicable to quickly slow an engine by gradually starving it of fuel.

In contrast, the Bosch type injection pump is a low volume pump, the volume of fuel in it being measured in ounces.

SUMMARY OF THE INVENTION

According to the present invention; the vehicle speed limiting system is used with an inline low volume injection pump which is operative to successively trigger a flow of fuel directly to the individual fuel injectors. A fuel control means is disclosed having a fuel control valve located in the fuel supply line to the pump.

Control means are employed to maintain the fuel control valve open to allow normal fuel flow to the injection pump. An engine speed-sensing means produces a speed signal representative of engine speed. When the signal indicates the engine, has reached a speed above a preset limit, the control means closes the fuel control valve, and also actuates a pressure regulator means to open a pressure regulator valve in the line extending from the fuel control valve to the return fuel line which empties into the fuel supply.

The shutoff of fuel is complete except for the small amount of residual fuel in the low volume injection pump, and also a small amount of fuel which is allowed by the fuel control means to feed into the injection pump. The amount of fuel passed is just sufficient to prevent pump cavitation. With this arrangement the engine immediately begins to slow relatively imperceptibly. When the speed drops by, for example, one to two miles per hour, a reverse operation occurs. The fuel Control valve opens and the pressure regulator valve closes, and normal fuel flow occurs.

The low volume pump is preferably the Bosch type of pump, or a rotary pump, which are connected directly to the individual injectors rather than to a fuel rail or the like.

DESCRIPTION OF PREFERRED EMBODIMENT

Figure 1:
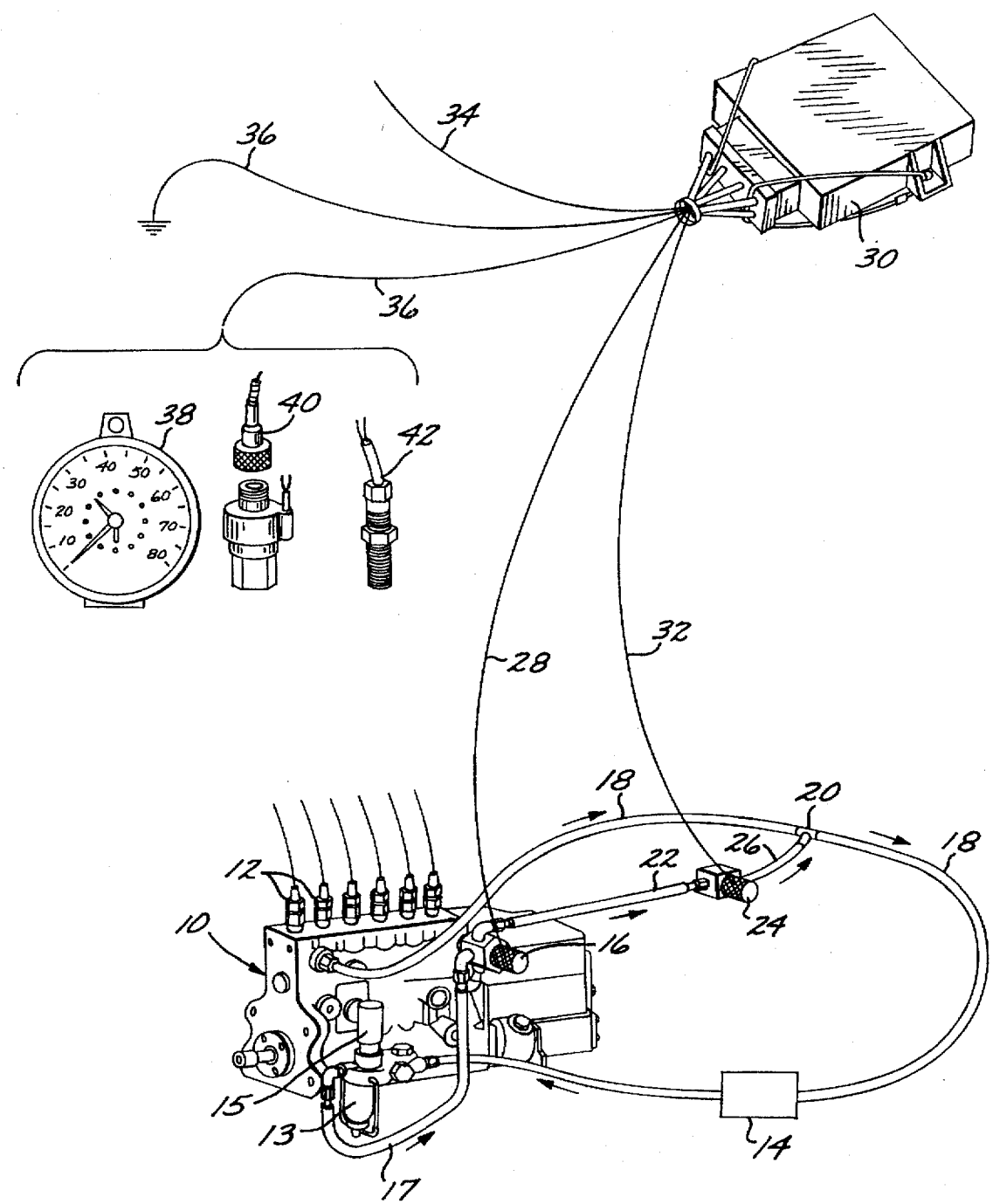
FIG. 1 is a generally schematic view of the various components of the present invention.

Referring to the drawings, and particularly to FIG. 1, the present vehicle speed limiting system includes a low volume inline fuel injection pump 10, a sample of which is the Bosch type injection pump. The pump 10 is associated with a diesel engine (not shown) of the type commonly used in large trucks or the like.

The pump 10 includes a plurality of fuel injectors 12, and is operative to supply fuel successively to the individual injectors under the control of a cam shaft or the like (not shown).

Fuel is supplied by a lift or supply pump 13 which draws fuel from a fuel supply or tank 14 and pumps it through a conventional filter and hand pump assembly 15 that is coupled by a connecting conduit to a normally open fuel control 16. The fuel control 16 will be described in further detail in conjunction with FIG. 4.

The fuel control 16 supplies fuel to the injector pump 10 for successive distribution to the individual fuel injectors 12, as will be apparent to those skilled in the art.

The injection pump 10 is coupled to a return line 18 which includes a T-fitting 20. Downstream from the fitting 20 the return line empties into the fuel tank 14.

The fuel control 16 is also coupled by means of a conduit 22 to a normally closed pressure regulator 24 which in turn is coupled by a conduit 26 to the T-fitting 20.

The fuel control 16 is electrically coupled by an electrical lead 28 to an electronic system control generally indicated at 30. In similar fashion the pressure regulator is electrically coupled by in electrical lead 32 to the system control 30.

The system control 30 derives power through an electrical lead 34 which is connected to the vehicle ignition switch (not shown). Vehicle voltage is regulated to 8 volts with reverse polarity protection. The system control is grounded through an electrical lead 36.

The system control 30 is responsive to a speed signal by means of a conventional comparator circuit (not shown). When the speed signal is equal to the preset level of the comparator, a signal is transmitted to a 10 ampere capacity single pole double throw relay (not shown) forming a part of the control 30. The relay de-energizes and sends signals through the leads 28 and 30, respectively, to close a valve of the fuel control 16 and to open a valve of the pressure regulator 24, and thereby place the vehicle speed limiting system in its speed limiting mode.

When the vehicle speed is reduced approximately 1 to 2 miles per hour below the compared set point, the relay is again energized, sending signals to the fuel control 16 to open and to the pressure regulator 24 to close, returning normal fuel supply to the fuel injection pump 10.

The speed signal may be derived from any one of several speed sensing means, such as the diagrammatically indicated commercially available tachograph 38, a magnetic pickup 40 mounted in the vehicle flywheel housing (not shown) to sense engine RPM or in the final drive of the transmission (not shown), or a conventional signal generator 42 mounted in-line of the vehicle speedometer cable (not shown). The speed signal passes to the system control 30 by means of an electrical lead 36 connected to the selected speed sensing means.

Figure 4:
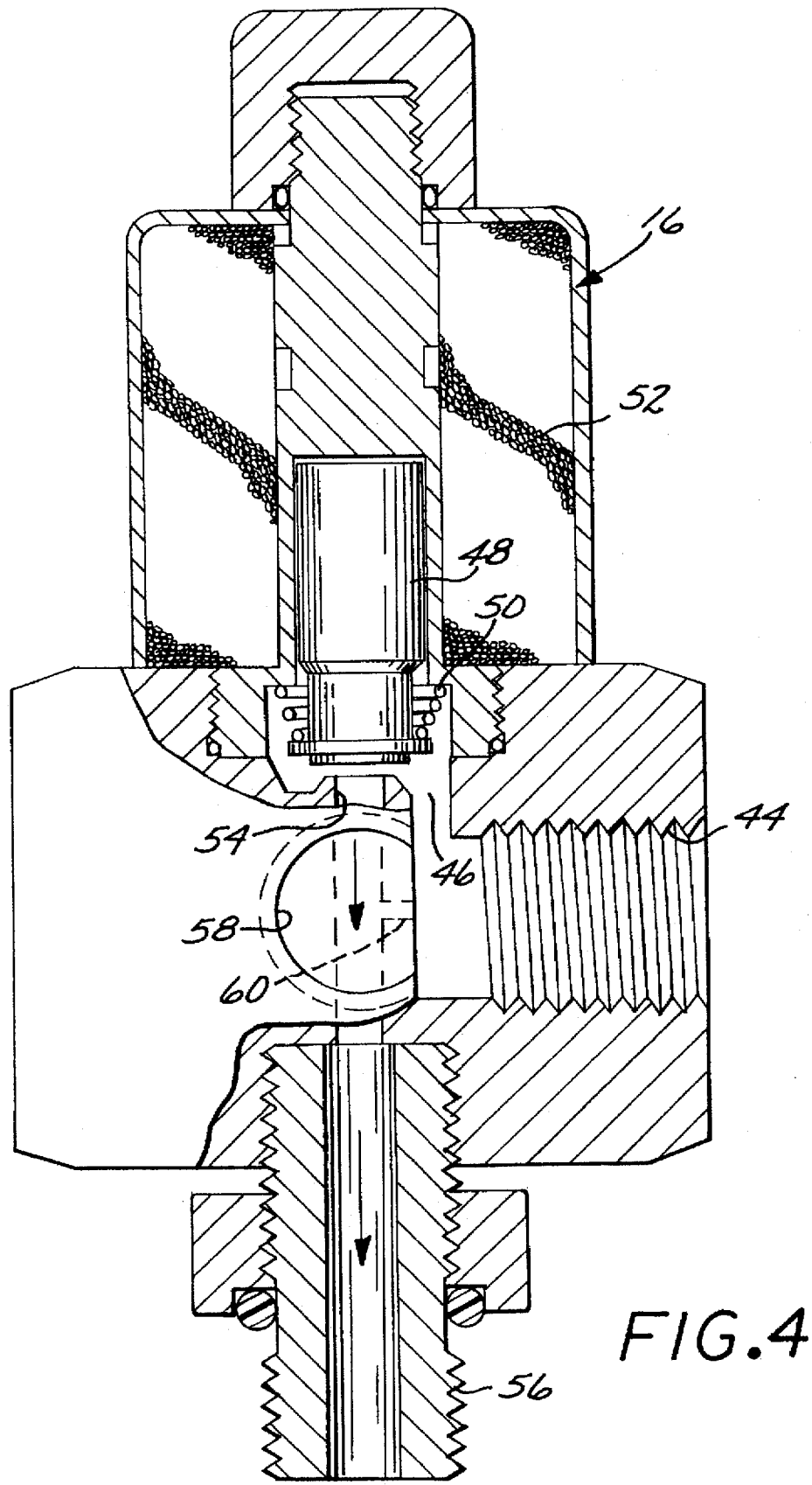
FIG. 4 is an enlarged longitudinal cross sectional view of the fuel control means, illustrating the fuel control valve in its normally open position.

Referring now to FIG. 4, the fuel control 16 is illustrated in its open position in which fuel from the conduit 17 passes through an inlet port 44 of the fuel control 16, and through a relatively large passageway 46. The passageway 46 extends across the underside of a plunger 48 which is raised to the illustrated position against the bias of a spring 50 upon energization of a surrounding solenoid 52.

The passageway 46 communicates with a central bore 54 which connects with a port fitting 56 adapted to thread into a complemental threaded opening (not shown) in the fuel injection pump 10. The fuel control 16 also includes an outlet port 58 which opens into the conduit 22 which is connected to the pressure regulator 24.

An important feature of the fuel control valve 16 is the provision of a small passageway or orifice 60 which is quite small, in the order of 0.020 inches. When the solenoid 52 is de-energized, and the valve or plunger 48 is released to cover and block the upper end of the bore 54, the valve 16 is closed and fuel can no longer flow through the bore 54 to the fuel injection pump. However, the fuel to the fuel injection pump is not completely cut off because a very small amount continues to flow through the orifice 60 to the pump. The size of the orifice is calculated such that the small amount of fuel passing through it is sufficient so that cavitation will not occur.

When the fuel control valve 16 has closed, the pressure regulator 24 is open, as previously indicated, so that a constant supply pressure is maintained to control the fuel volume supplied through the orifice 60.

Figure 2:
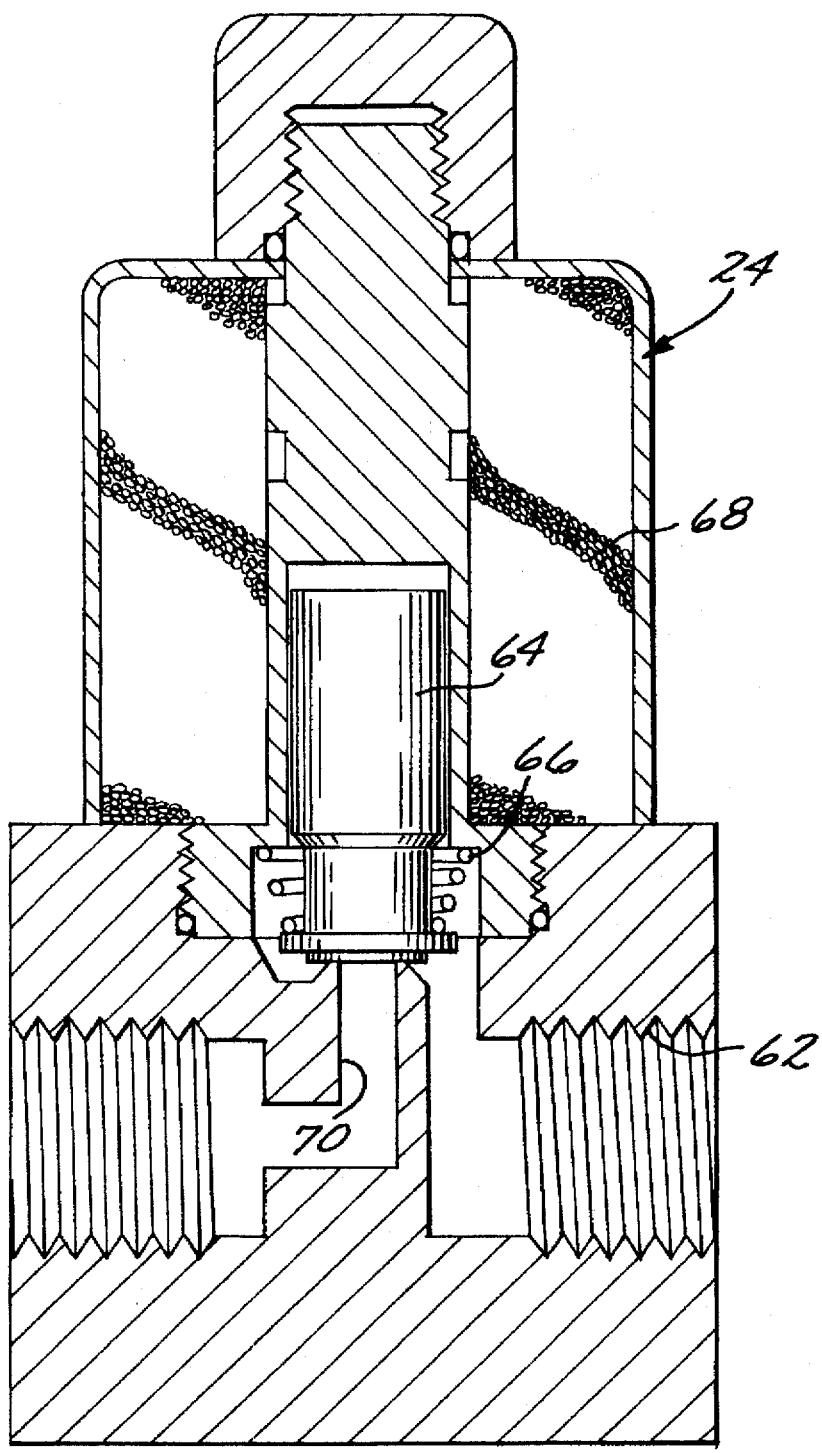
FIG. 2 is an enlarged longitudinal cross sectional view of the pressure regulator means, illustrating the pressure regulator valve in its normally closed position.
Figure 3:
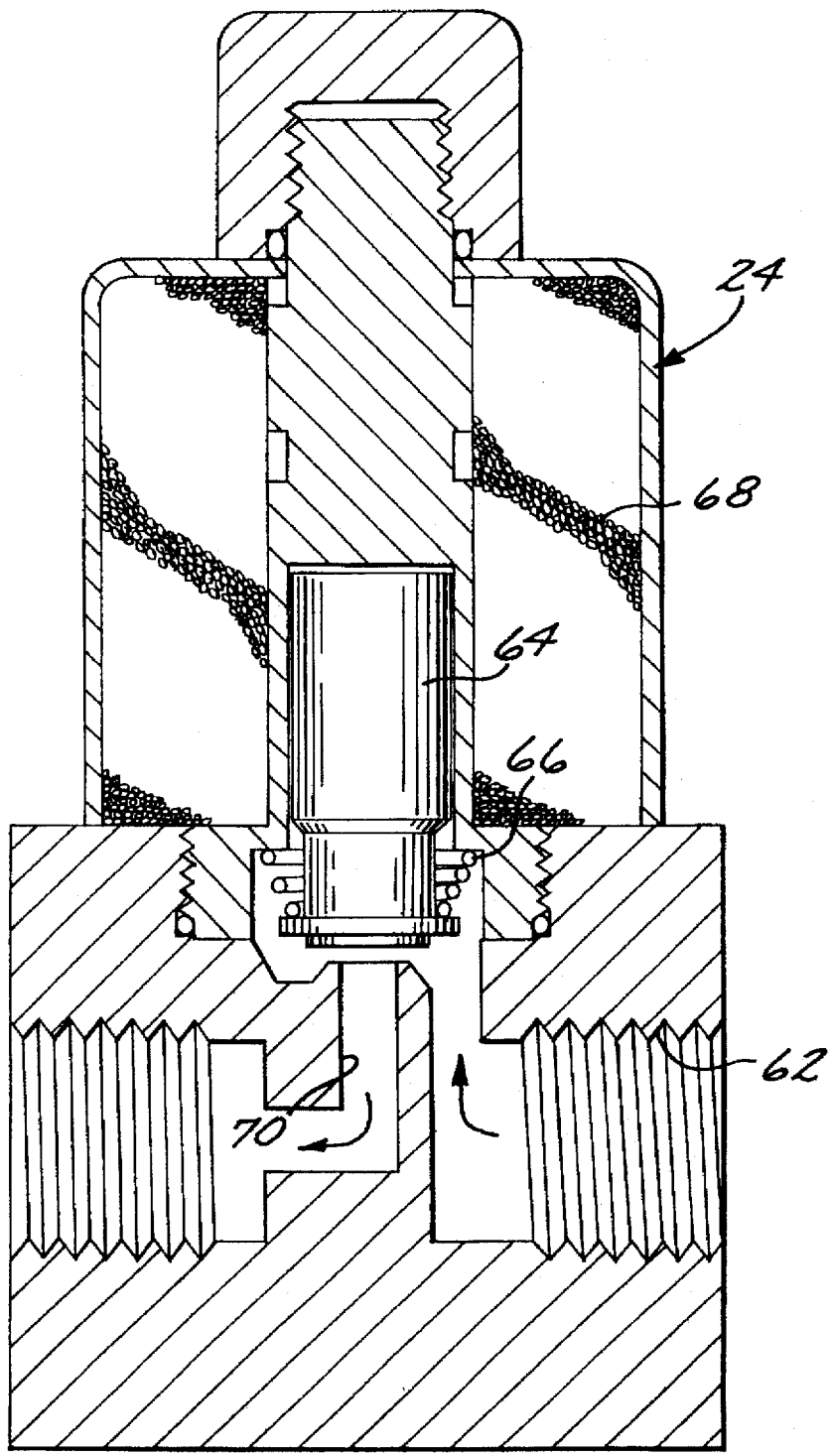
FIG. 3 is a view similar to FIG. 2, but illustrating the pressure regulator valve in its open position.

Referring now to FIGS. 2 and 3, the pressure regulator 24 includes an inlet port 62 which receives the conduit 22 which is connected to the fuel control valve 16. The regulator includes a valve or plunger 64 which is raised against the bias of a spring 66 upon energization of a surrounding solenoid 68. In its raised position, as shown in FIG. 3, fuel flows across the underside of the plunger 64 and into a central bore 70 in communication with an outlet port 72 which receives the conduit 26 that is coupled to the return line 18.

Upon de-energization of the solenoid 68, the plunger 64 drops to close off the bore 70, thereby cutting off any fuel flow from the fuel control valve 16 to the return line 18.

Summarizing the foregoing, when the system control 30 senses a speed signal equal to the preset limit, it signals the fuel control valve 16 to close and the pressure regulator 24 to open. In the closed position of the valve 16, the metering orifice 60 allows a predetermined amount of fuel to be supplied to the injection pump to prevent pump cavitation, but there is sufficient cutoff of fuel to result in vehicle speed limitation.

The pressure regulator 24 is precisely orificed to regulate the supply pressure required to maintain a consistent fuel flow through the metering orifice 60 as needed for fuel flow balance during the speed limitation mode.

When the vehicle speed drops by about 1 to 2 miles per hour, the system control 30 signals the fuel control valve 16 to open and the pressure regulator 24 to close, restoring normal fuel flow.

If the vehicle speed again increases to the preset limit, the cycle is repeated and no amount of throttle depression will cause the vehicle speed to exceed the speed limit setpoint, except on a downhill grade. As the speed limit point is reached, the reduction of power is smooth, and the return cycle is similar to a normal accelerator advancement.

Although a preferred embodiment of the invention has been described herein, it will be apparent to those skilled in the art that variations may be made in the invention without departing from the spirit of the invention or the scope of the appended claims.

What is claimed is:

1. A vehicle speed limiting system for a vehicle having an engine which includes a plurality of fuel injectors; fuel supply means; and an injection pump operative to successively trigger a flow of fuel directly to the individual fuel injectors, the system comprising:

speed sensing means for producing a speed signal related to the engine speed;

pressure regulator means coupled to the fuel supply means;

fuel control means for metering fuel flow to the engine, the fuel control means being coupled to the pressure regulator means, to the fuel supply means and to the injection pump, the fuel control means including a first passageway between the fuel supply means and the injection pump, and also a second passageway smaller than the first passageway between the fuel supply means and the injection pump, the fuel control means normally being in an open state allowing fuel flow through the first passageway, the fuel control means including a valve actuable to a closed state preventing fuel flow through the first passageway and allowing fuel flow only through the small passageway;

the pressure regulator means normally being in a closed state to prevent fluid flow return from the fuel control means to the fuel supply means, the pressure regulator means being actuable to an open state allowing such return flow simultaneously with actuation of the fuel control means to a closed state; and system control means operative to place the fuel control valve in the open state and the regulator valve in the closed state, and further operative in response to a speed signal in excess of a preset limit to place the regulator valve in the open state and the fuel control valve in the closed state whereby fuel flow to the injection pump is confined to the second passageway in the fuel control means.

2. A speed limiting system according to claim 1 wherein the injection pump is an inline, low volume type characterized by a low residual amount of fuel between the injection pump and the injectors upon placement of the fuel control means in the closed state.

3. A speed limiting system according to claim 1 wherein the engine is a diesel engine.

4. A speed limiting system according to claim 1 wherein the speed signal is provided by a tachograph.

5. A speed limiting system according to claim 1 wherein the speed signal is provided by a signal generator.

6. A speed limiting ,system according to claim 1 wherein the speed signal is provided by a magnetic sensor.

7. A speed limiting system according to claim 1 wherein the fuel control means includes a fuel control valve having a solenoid energizable by the system control means to place the fuel control means in the open state.

8. A Speed limiting system according to claim 1 wherein the pressure regulator means includes a regulator valve having a solenoid energizable by the system control means to place the regulator means in the closed state.

9. A speed limiting system according to claim 1 wherein the fuel control means is always in the open state when the regulator means is in the closed state, and always in the closed state, except for limited fuel flow through the second passageway, when the regulator means is in the open state.

10. A special limiting system according to claim 1 wherein the second passageway is an orifice approximately 0.020 inch in diameter.

* * * * *